United States Patent [19]

Tittmann et al.

[11] Patent Number: 5,705,605
[45] Date of Patent: Jan. 6, 1998

[54] PROCESS FOR THE PREPARATION OF A DYEING AUXILIARY

[75] Inventors: Rolf Tittmann, Lörrach, Germany; Ruth Roth, Basel, Switzerland

[73] Assignee: Ciba Specialty Chemicals Corporation, Tarrytown, N.Y.

[21] Appl. No.: 498,847

[22] Filed: Jul. 6, 1995

[30] Foreign Application Priority Data

Jul. 12, 1994 [CH] Switzerland .................... 2222/94

[51] Int. Cl.$^6$ ............................................ C08G 73/10
[52] U.S. Cl. ............................ 528/422; 528/172; 528/229; 528/232; 528/243; 528/256; 528/257; 528/266; 528/268; 528/363; 528/367
[58] Field of Search ............................. 528/232, 243, 528/256, 257, 422, 363, 266, 268, 172, 229, 367

[56] References Cited

U.S. PATENT DOCUMENTS

| 4,486,583 | 12/1984 | Takahashi et al. ............... 528/422 |
| 4,764,585 | 8/1988 | Heller et al. ..................... 528/233 |
| 5,442,039 | 8/1995 | Hefner, Jr. et al. ............... 528/422 |

FOREIGN PATENT DOCUMENTS

| 0431423 | 6/1991 | European Pat. Off. |
| 57-106782 | 7/1982 | Japan. |
| 57-115421 | 7/1982 | Japan. |
| 1164523 | 9/1969 | United Kingdom. |

OTHER PUBLICATIONS

Hendricks, 115: 161150g, Chem. Abs., (199).
Derwent Abs., 66956 E/32 (1982).

*Primary Examiner*—P. Hampton-Hightower
*Attorney, Agent, or Firm*—Kevin T. Mansfield; David R. Crichton

[57] ABSTRACT

There is described a process for the preparation of basic polycondensates, which comprises (a) reacting an amine of formula

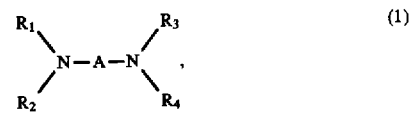

wherein $R_1$, $R_2$, $R_3$ and $R_4$ are each independently of one another hydrogen or alkyl which is unsubstituted or substituted by amino, hydroxy, cyano or $C_1$-$C_4$ alkoxy, and A is alkylene which may be substituted or interrupted by one or more than one hetero atom, with an ammonium salt in the presence of an anhydrous solvent, and (b) reacting the protonised product obtained according to (a) with a cyanamide at elevated temperature.

The polycondensates or salts thereof prepared according to this process are particularly suitable aftertreatment agents for enhancing the wetfastness properties of dyed or printed textile material.

13 Claims, No Drawings

PROCESS FOR THE PREPARATION OF A DYEING AUXILIARY

The present invention relates to a process for the preparation of water-soluble polycondensates by reacting polyfunctional amines with cyanamides or derivatives thereof with elimination of ammonia.

A great number of such polycondensates, processes for their preparation and the use thereof for enhancing the fastness properties of dyeings with substantive dyes are known. However, the processes of the prior art have drawbacks with respect to, inter alia, handling, process control and ecology. One such drawback is, for example, that the reaction is often carried out in the presence of a metal salt catalyst, traces of which are still present in the end product and need to be removed by troublesome purifying processes. Another known process is carried out batchwise by mixing all the reactants and is problematical on account of the difficulty of controlling the very vigorous reaction with elimination of ammonia. A further process has been proposed which is carried out without any addition of solvent, but which is only of limited viability on account of the highly viscous nature of the reaction mixture.

Surprisingly it has now been found that corresponding polycondensates can be prepared simply and with markedly enhanced process safety by first converting the polyfunctional amine with an ammonium compound into a protonised form and then reacting the protonised compound in a second step with the cyanamide.

Accordingly, it is the object of the invention to provide a process for the preparation of basic polycondensates, which process comprises (a) reacting an amine of formula

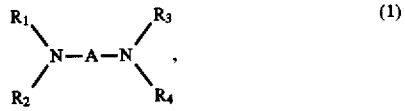

(1)

wherein $R_1$, $R_2$, $R_3$ and $R_4$ are each independently of one another hydrogen or alkyl which is unsubstituted or substituted by amino, hydroxy, cyano or $C_1$-$C_4$alkoxy, and A is alkylene which is unsubstituted or substituted or interrupted by one or more than one hetero atom, with an ammonium salt in the presence of an anhydrous solvent, and (b) reacting the protonised product obtained according to (a) with a cyanamide at elevated temperature.

A in formula (1) is preferably $C_2$-$C_{20}$ alkylene which may be interrupted by —O—, —S—, —NH— or —N($C_1$-$C_4$alkyl)- or substituted by OH. A is preferably $C_2$-$C_{20}$ alkylene which is interrupted by one or more than one —NH— group.

$R_1$, $R_2$, $R_3$ and $R_4$ are each independently of one another preferably hydrogen or $C_1$-$C_4$alkyl.

Illustrative examples of compounds of formula (1) which may suitably be used in reaction step (a) are typically 1,4-butanediamine, 1,6-hexanediamine, dipropylenetriamine, N-(2-aminoethyl)-1,3-propanediamine, N,N-bis(2-aminopropyl)methylamine, polyethylenimines or polyethylenepolyamines such as diethylenetriamine, triethylenetetramine, tetraethylenepentamine or pentamethylenehexamine. Preferred compounds of formula (1) in step (a) are polyethylenepolyamines and among these in particular diethylenetriamine.

Ammonium salts suitable for the novel process are typically ammonium salts of organic or inorganic acids such as ammonium chloride, ammonium sulfate, ammonium carbonate, ammonium formate or ammonium acetate. The use of ammonium chloride is preferred.

The anhydrous solvent is typically a hydroxyl group-containing solvent, preferably one having a boiling point of above 150° C. and, more particularly, of above 180° C., or a mixture of different solvents of this kind. Typical examples are ethylene glycol, 1,2- or 1,3-propylene glycol, butylene glycol, di-, tri- or tetraethylene glycol and the ethers thereof, as well as polyethylene glycols having a molecular weight from typically 600 to 5000, and mixtures thereof.

Cyanamides suitable for step (b) are typically cyanamide, dicyandiamide, guanidine and biguanidine. In step (b) the use of dicyandiamide is preferred.

In step (a) the compound of formula (1) and the ammonium salt are typically used in a molar ratio from 1:0.1 to 1:2.5, preferably from 1:0.7 to 1:2 and, most preferably, from 1:1 to 1:1.5. The amount of hydroxyl group-containing solvent may vary over a wide range and is typically from 0.2 to 20 mol and, preferably, from 0.4 to 5 mol per mol of the compound of formula (1).

The reaction of step (a) is preferably carried out at elevated temperature, conveniently in the range from 80° to 200° C., preferably from 100° to 160° C. and, most preferably, from 110° to 140° C. The compound of formula (1) is preferably charged to the hydroxyl group-containing solvent or solvent mixture, and the ammonium compound is then added to this mixture, in which case it is convenient to carry out the reaction step under inert conditions, typically under nitrogen.

The protonised compound of formula (1) obtained according to (a) is then reacted with e.g. 0.5 to 2 mol, preferably 0.8 to 1.5 mol, of cyanamide per mol of starting compound of formula (1). The reaction according to (b) is preferably carried out in the presence of one or more than one of the above-mentioned hydroxyl group-containing solvents at elevated temperature, which may typically be in the range from 80° to 250° C. and, preferably, from 140° to 220° C.

The preferred procedure is to add the cyanamide in increments to the reaction mixture obtained according to (a) in the temperature range from typically 80° to 200° C., preferably from 140° to 180° C., and, when the addition is complete, to allow the reaction to go to completion at elevated temperature, typically in the range from 160° to 250° C. and, preferably, from 180° C. to 220° C. In the course of the reaction, the reaction mixture becomes viscous and ammonia is slowly eliminated. The condensation reaction is usually carried out until the ammonia is eliminated completely or is discontinued on reaching a desired viscosity of the reaction mixture.

A preferred embodiment of this invention is a process for the preparation of basic polycondensates, which comprises (a) reacting diethylenetriamine, under inert conditions, with an ammonium salt selected from the group consisting of ammonium chloride, ammonium sulfate, ammonium carbonate, ammonium formate or ammonium acetate, in the presence of a hydroxyl group-containing solvent, and (b) reacting the protonised product obtained according to (a) with a dicyandiamide at elevated temperature.

A particularly preferred embodiment of this invention is a process for the preparation of basic polycondensates, which comprises (a) reacting 1 molar equivalent of diethylenetriamine, under inert conditions, with 1 to 1.5 molar equivalents of ammonium chloride in the presence of 0.4 to 5 molar equivalents of ethylene glycol, 1,2- or 1,3-propylene glycol, butylene glycol, di-, tri- or tetraethylene glycol or an ether thereof, of a polyethylene glycol having a molecular weight of 600 to 5000, or of a mixture of two or more than two of the cited solvents in the temperature range from 110° to 140° C., and (b) adding to the reaction mixture containing the protonised compound of formula (1) obtained according to (a) 0.5 to 2 molar equivalents of dicyandiamide in the temperature range from 140° to 180° C. and, when the addition is complete, allowing the reaction to go to completion in the temperature range from 160° to 250° C.

The reaction products are solid melts at room temperature having basic properties and forming clear solutions in water; they may be converted into their water-soluble salts by neutralisation with inorganic or organic acids such as hydrochloric acid or acetic acid.

The reaction mixture obtained according to (b) is preferably worked up by diluting it with water, thereby adjusting it to a predetermined product final concentration which may typically be from 20 to 80% by weight, and preferably, from 35 to 75% by weight, based on the entire mixture.

The novel process provides polycondensates simply, in almost quantitative yield, and with high process safety. The space-time yield is excellent.

The polycondensates or salts thereof prepared according to the process of this invention are particularly suitable aftertreatment agents for enhancing the wetfastness properties of dyed or printed hydroxyl group-containing or amino group-containing textile fiber material, preferably of textile material made of natural or regenerated cellulose dyed with direct dyes or reactive dyes.

The following Examples illustrate the invention. Parts are by weight, unless otherwise stated.

EXAMPLE 1

206.4 parts of diethylenetriamine and 55.6 parts of ethylene glycol are put into a reactor at room temperature in an inert gas atmosphere and heated under a weak stream of nitrogen to 120° C. 128 parts of ammonium chloride are then added in increments over 1 hour such that the temperature in the reactor is kept at >118° C. When the addition is complete, the reaction mixture is heated to 160° C. and 218 parts of dicyandiamide are added under inert conditions over 1 hour such that the temperature in the reactor remains at above 155° C. The mixture is then heated to the temperature range from 180° to 210° C. and kept at this temperature for c. 1 to 5 hours. When the reaction is complete, 200 parts of deionised water are added to the mixture over c. 20 to 25 minutes, to give 665 parts of a solution having a solids content of 70%.

EXAMPLE 2

206.4 parts of diethylenetriamine and 35.9 parts of ethylene glycol are put into a reactor at room temperature in an nitrogen atmosphere and heated under a weak stream of nitrogen to 120° C. 128 parts of ammonium chloride are then added in increments over 1 hour such that the temperature in the reactor is kept at >118° C. When the addition is complete, the reaction mixture is heated to 160° C. and 218 parts of dicyandiamide are added under inert conditions over 1 hour such that the temperature in the reactor remains at above 155° C. The mixture is then heated to the temperature range from 180° to 185° C. and kept at this temperature for c. 3 hours. When the reaction is complete, 200 parts of deionised water are added to the mixture over c. 20 to 25 minutes, to give 665 parts of a solution having a solids content of 70%.

EXAMPLE 3

206.4 parts of diethylenetriamine and 35.9 parts of ethylene glycol are put into a reactor at room temperature in an inert gas atmosphere and heated under a weak stream of nitrogen to 120° C. 128 parts of ammonium chloride are then added in increments over 1 hour such that the temperature in the reactor is kept at >118° C. When the addition is complete, the reaction mixture is heated to 160° C. and 218 parts of dicyandiamide are added under inert conditions over 1 hour such that the temperature in the reactor remains above 155° C. The mixture is then heated to 207° C. and kept at this temperature for c. 1 hour. When the reaction is complete, 200 parts of deionised water are added to the mixture over c. 20 to 25 minutes, to give 665 parts of a solution having a solids content of 70%.

EXAMPLE 4

206.4 parts of diethylenetriamine and 102.2 parts of ethylene glycol are put into a reactor at room temperature in an inert gas atmosphere and heated under a weak stream of nitrogen to 120° C. 128 parts of ammonium chloride are then added in increments over 1 hour such that the temperature in the reactor is kept at >118° C. When the addition is complete, the reaction mixture is heated to 160° C. and 218 parts of dicyandiamide are added under inert conditions over 1 hour such that the temperature in the reactor remains at above 155° C. The mixture is then heated to 183° C. and kept at this temperature for c. 1 hour. When the reaction is complete, 200 parts of deionised water are added to the mixture over c. 20 to 25 minutes, to give 665 parts of a solution having a solids content of 70%.

EXAMPLE 5

206.4 parts of diethylenetriamine and 55.3 parts of propylene glycol are put into a reactor at room temperature in an inert gas atmosphere and heated to 120° C. under a weak stream of nitrogen. 128 parts of ammonium chloride are then added in increments over 1 hour such that the temperature in the reactor is kept at >118° C. When the addition is complete, the reaction mixture is heated to 160° C. and 218 parts of dicyandiamide are added under inert conditions over 1 hour such that the temperature in the reactor remains at above 155° C. The mixture is then heated to 190° C. and kept at this temperature for c. 1 hour. When the reaction is complete, 200 parts of deionised water are added to the mixture over c. 20 to 25 minutes, to give 665 parts of a solution having a solids content of 70%.

EXAMPLE 6

206.4 parts of diethylenetriamine and 110.5 parts of propylene glycol are put into a reactor at room temperature in an inert gas atmosphere and heated under a weak stream of nitrogen to 120° C. 128 parts of ammonium chloride are then added in increments over 1 hour such that the temperature in the reactor is kept at >118° C. When the addition is complete, the reaction mixture is heated to 160° C. and 218 parts of dicyandiamide are added under inert conditions over 1 hour such that the temperature in the reactor remains at above 155° C. The mixture is then heated to 190° C. and kept at this temperature for c. 1 hour. When the reaction is complete, 200 parts of deionised water are added to the mixture over c. 20 to 25 minutes, to give 665 parts of a solution having a solids content of 70%.

EXAMPLE 7

206.4 parts of diethylenetriamine and 165.75 parts of propylene glycol are put into a reactor at room temperature in an inert gas atmosphere and heated under a weak stream of nitrogen to 120° C. 128 parts of ammonium chloride are then added in increments over 1 hour such that the temperature in the reactor is kept at >118° C. When the addition is complete, the reaction mixture is heated to 160° C. and 218 parts of dicyandiamide are added under inert conditions over 1 hour such that the temperature in the reactor remains at above 155° C. The mixture is then heated to 190° C. and kept at this temperature for c. 1 hour. When the reaction is complete, 200 parts of deionised water are added to the mixture over c. 20 to 25 minutes, to give 665 parts of a solution having a solids content of 70%.

What is claimed is:

1. A process for the preparation of a basic polycondensate, which process comprises (a) reacting an amine of the formula

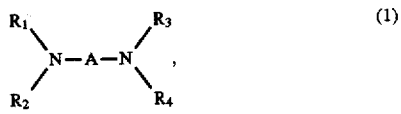

wherein $R_1$, $R_2$, $R_3$ and $R_4$ are each independently of one another hydrogen or $C_1$-$C_4$ alkyl, and A is $C_2$-$C_{20}$ alkylene which is optionally interrupted by one or more than one —NH— group, with an ammonium salt in the presence of an anhydrous solvent containing a hydroxyl group to produce a protonised product, and (b) reacting the protonised product obtained according to (a) with a cyanamide at elevated temperature.

2. A process according to claim 1, wherein A in formula (1) is $C_2$-$C_{20}$ alkylene.

3. A process according to claim 1, wherein the compound of formula (1) is a polyethylenepolyamine.

4. A process according to claim 1, wherein the compound of formula (1) is diethylenetriamine.

5. A process according to claim 1, wherein the ammonium compound is ammonium chloride, ammonium sulfate, ammonium carbonate, ammonium formate or ammonium acetate.

6. A process according to claim 1, wherein the ammonium compound is ammonium chloride.

7. A process according to claim 1, wherein the anhydrous solvent is ethylene glycol, 1,2- or 1,3-propylene glycol, butylene glycol, di-, tri- or tetraethylene glycol or an ether thereof, a polyethylene glycol having a molecular weight from 600 to 5000, or a mixture of two or more than two of the said solvents.

8. A process according to claim 1, wherein the cyanamide in step (b) is dicyandiamide.

9. A process according to claim 1, which comprises using the compound of formula (1) and the ammonium salt in step (a) in a molar ratio from 1:1 to 1:1.5.

10. A process according to claim 1, which comprises charging in step (a) the compound of formula (1) to the hydroxyl group-containing solvent or solvent mixture, adding the ammonium compound, and carrying out the reaction of step (a) under inert conditions.

11. A process according to claim 1, wherein step (b) is carried out by adding the cyanamide to the reaction mixture of step (a) in the temperature range from 140° to 180° C. and, when the addition is complete, allowing the reaction to go to completion in the temperature range from 160° to 250° C.

12. A process according to claim 1 for the preparation of a basic polycondensate, which process comprises (a) reacting diethylenetriamine, under inert conditions, with an ammonium salt selected from the group consisting of ammonium chloride, ammonium sulfate, ammonium carbonate, ammonium formate and ammonium acetate, in the presence of a hydroxyl group-containing solvent, and (b) reacting the protonised product of step (a) with a dicyandiamide at elevated temperature.

13. A process according to claim 1 for the preparation of a basic polycondensate, which comprises (a) reacting 1 molar equivalent of diethylenetriamine, under inert conditions, with 1 to 1.5 molar equivalents of ammonium chloride, in the presence of 0.4 to 5 molar equivalents of ethylene glycol, 1,2- or 1,3-propylene glycol, butylene glycol, di-, tri- or tetraethylene glycol or an ether thereof, of a polyethylene glycol having a molecular weight from 600 to 5000, or of a mixture of two or more than two of the cited solvents, in the temperature range from 110° to 140° C., and (b) adding to the reaction mixture containing the protonised compound of formula (1) of step (a) 0.5 to 2 molar equivalents of dicyandiamide in the temperature range from 140° to 180° C. and, when the addition is complete, allowing the reaction to go to completion in the temperature range from 160° to 250° C.

* * * * *